United States Patent

Sakai et al.

[11] Patent Number: 6,121,363
[45] Date of Patent: Sep. 19, 2000

[54] CRYSTALLINE PROPYLENE BLOCK-COPOLYMER COMPOSITION FOR USE IN AUTOMOBILE PARTS

[75] Inventors: Ikunori Sakai; Mikio Hashimoto, both of Sakai; Takayuki Nagai, Toyota; Takao Nomura, Toyota; Masatoshi Matsuda, Toyota; Osamu Kito, Nisshin; Hisayuki Iwai, Aichi-Gun, all of Japan

[73] Assignees: Grand Polymer Co., Ltd., Tokyo; Toyota Jidosha Kabushiki Kaisha, Toyota, both of Japan

[21] Appl. No.: 09/251,331

[22] Filed: Feb. 17, 1999

[30] Foreign Application Priority Data

Feb. 17, 1998 [JP] Japan ................................. 10-035268

[51] Int. Cl.[7] ............................. C08K 3/22; C08L 53/00; C08L 53/02; C08L 23/10
[52] U.S. Cl. ............................................. 524/451; 525/89
[58] Field of Search ................................ 524/451; 525/89

[56] References Cited

U.S. PATENT DOCUMENTS

| | | |
|---|---|---|
| 5,045,589 | 9/1991 | Ueno . |
| 5,543,454 | 8/1996 | Kamakura et al. . |

FOREIGN PATENT DOCUMENTS

| | | |
|---|---|---|
| 0463963 | 1/1992 | European Pat. Off. . |
| 0509662 | 10/1992 | European Pat. Off. . |
| 0566141 | 10/1993 | European Pat. Off. . |
| 0697435 | 2/1996 | European Pat. Off. . |
| 0794225 | 9/1997 | European Pat. Off. . |
| 8020684 | 1/1996 | Japan . |
| 8176395 | 7/1996 | Japan . |
| 9216975 | 8/1997 | Japan . |

Primary Examiner—David J. Buttner
Attorney, Agent, or Firm—Sherman and Shalloway

[57] ABSTRACT

A crystalline propyleiie block-copolymer composition exhibiting superior flowability upon molding for use in automobile parts, which composition comprises 41 to 71% by weight of a crystalline propylene block-copolymer composed of a propylene homopolymer portion (Fp) and an ethylene/propylene random copolymer portion (Fc) and having an ethylene content of 1 to 10% by weight and a melt flow rate (MFR) of 20 to 100 g/10 min.; 12 to 22% by weight of a first hydrogenated product of a block-copolymer having a relatively smaller stylene content; 2 to 12% by weight of a second hydrogenated product of a block-copolymer having a relatively greater stylene content; and 15 to 25% by weight of talc, wherein the propylene homopolymer portion (Fp) contains 20 to 50% by weight of a low molecular weight propylene homopolymer having an MFR of 400 to 1,000 g/10 min., the average MFR being 100 to 350 g/10 min. and the isotactic pentad fraction being at least 98%, and wherein the said (Fc) has an intrinsic viscosity of 7 dl/g or higher.

5 Claims, No Drawings

CRYSTALLINE PROPYLENE BLOCK-COPOLYMER COMPOSITION FOR USE IN AUTOMOBILE PARTS

FIELD OF THE INVENTION

The present invention relates to a crystalline propylene block-copolymer composition for use in automobile parts, which comprises a crystalline propylene block-copolymer, elastomers and talc. More specifically, it relates to a crystalline propylene block-copolymer composition for use in automobile parts, which is superior in the flowability upon injection molding.

BACKGROUND OF THE INVENTION

Polypropylene has found wide applications in various fields including household commodities, kitchen utensils, packaging films, automobile parts, machine parts and electric appliances, in which additives are incorporated in accordance with each specific required performance. For example, polypropylene compositions containing such additives as an elastomer and talc are employed in application fields in which mechanical strength is required, such as automobile parts.

There has, however, been expected an improvement in the flowability upon injection molding for the polypropylene compositions of prior art exhibiting improved material properties by the addition of an elastomeric component and a talc component.

SUMMARY OF THE INVENTION

An object of the present invention is to provide a crystalline propylene block-copolymer composition for use in automobile parts, which is superior in the flowability upon molding and also in the balance between the physical properties, such as flexural modulus, impact resistance, hardness and brittle temperature.

The crystalline propylene block-copolymer composition for use in automobile parts according to the present invention, comprises (A) 41 to 71% by weight of a crystalline propylene block-copolymer composed of a propylene homopolymer portion (Fp) and an ethylene/propylene random copolymer portion (Fc) and having an ethylene content of 1 to 10% by weight and a melt flow rate (MFR, determined at 230° C. under a load of 2160 g) of 20 to 100 g/10 min., (B) 12 to 22% by weight of a first hydrogenated product of a block-copolymer composed of blocks represented by the following formula (1) or (2), namely,

in which X stands for a polymer block of a vinyl-mono-substituted aromatic hydrocarbon, Y stands for an elastomeric polymer block of a conjugated diene and n is an integer of 1 to 5, wherein the content of X amounts to 5 to 22% by weight and the melt flow rate (MFR) for the entire block-copolymer is 0.5 to 70 g/10 min. and wherein the hydrogenation degree is at least 90 mole %, (C) 2 to 12% by weight of a second hydrogenated product of a block-copolymer composed of blocks represented by the following formula (1) or (2), namely,

in which X stands for a polymer block of a vinyl-mono-substituted aromatic hydrocarbon, Y stands for an elastomeric polymer block of a conjugated diene and n is an integer of 1 to 5, wherein the content of X amounts to 30 to 80% by weight and the melt flow rate (MFR) for the entire block-copolymer is 0.1 to 20 g/10 min. and wherein the hydrogenation degree is at least 90 mole %, and (D) 15 to 25% by weight of talc of a grade having an average particle size, determined by a laser beam diffraction method, of 1 to 5 μm, wherein, in the crystalline propylene block-copolymer (A), the said propylene homopolymer portion (Fp) contains 20 to 50% by weight of a low molecular weight propylene homopolymer (Fh) having a melt flow rate (MFR, determined at 230° C. under a load of 2160 g) of 400 to 1,000 g/10 min. and is constituted of a propylene homopolymer having an average melt flow rate (MFR, determined at 230° C. under a load of 2160 g), for the entire propylene homopolymer portion (Fp), of 100 to 350 g/10 min. and an isotactic pentad fraction (mmmm), determined by $^{13}$C-NMR, of at least 98% and the said ethylene/propylene random copolymer portion (Fc) is constituted of an ethylene/propylene random copolymer having an intrinsic viscosity [η], determined at 135° C. in decalin (decahydronaphthalene), of 7 dl/g or higher.

DETAILED DESCRIPTION OF THE INVENTION

The crystalline propylene block-copolymer (A) to be incorporated according to the present invention is constituted of a block-copolymer composed of a propylene homopolymer portion (represented hereinafter sometimes by Fp) and an ethylene/propylene random copolymer portion (represented hereinafter sometimes as Fc). The ethylene content in the entire block-copolymer (A) amounts to 1 to 10% by weight, preferably 3 to 8% by weight, and the melt flow rate (MFR, determined in accordance with ASTM D 1238 at 230° C. under a load of 2160 g; the same applies in the following) of the entire block-copolymer (A) is 20 to 100 g/10 min., preferably 30 to 90 g/10 min.

The propylene homopolymer portion (Fp) composing the crystalline propylene block-copolymer (A) is a homopolymer of propylene having an isotactic pentad fraction (mmmm) of at least 98%, preferably at least 98.5%.

The above-mentioned isotactic pentad fraction corresponds to the proportion of the isotactic chains as the pentad unit in the molecular chains of the crystalline propylene copolymer (A), which is determined using $^{13}$C-NMR and which is the proportion of the number of propylene monomeric units present in each center of the sequences of 5 monomeric units bound each other successively by meso-coupling. It is determined practically as the proportion of the mmmm peaks in the entire absorption peaks within the methyl-carbon region of $^{13}$C-NMR spectrum.

In general, a polymer material does not consist of an aggregate of molecules of same structure and same molecular weight but is a mixture of polymer molecules of different molecular weights, which exhibits certain material properties as a whole. The crystalline propylene block-copolymer (A) to be incorporated in the resin composition according to the present invention is also an aggregate of polymer molecules of different molecular weights and exhibits, with respect to the integrated polymer material, an ethylene content and an MFR as specified above, wherein further restrictions are incorporated according to the present invention in the propylene homopolymer portion (Fp) composing the block-copolymer (A) as to the molecular weight and the content thereof. Thus, the propylene homopolymer portion (Fp) has an MFR (average MFR for the entire homopolymer portion) of 100 to 350 g/10 min., preferably 150 to 300 g/10 min., and contains 20 to 50% by weight, preferably 25 to 40% by weight, of a low molecular weight propylene homopolymer (Fh) having an MFR of 400 to 1,000 g/10 min., preferably 400 to 800 g/10 min., based on the weight of the entire propylene homopolymer portion (Fp). MFR serves as an indicator for the molecular weight, wherein the greater the value of MFR, the smaller would be the molecular weight.

The ethylene/propylene random copolymer portion (Fc) composing the crystalline propylene block-copolymer (A) has an intrinsic viscosity [η], determined at 135° C. in decalin, of at least 7 dl/g, preferably 8 to 15 dl/g.

The ethylene content in the ethylene/propylene random copolymer portion (Fc) may desirably amount to 15 to 50% by weight, preferably 20 to 30% by weight.

The content of the propylene homopolymer portion (Fp) in the crystalline propylene block-copolymer (A) may favorably amount to 85 to 99% by weight, preferably 90 to 97% by weight and the content of the ethylene/propylene random copolymer portion (Fc) in the crystalline propylene block-copolymer (A) may favorably amount to 1 to 15% by weight, preferably 3 to 10% by weight.

It is permissible that only one single product of crystalline propylene block-copolymer (A) is employed or two or more products thereof are used in a combination.

The crystalline propylene block-copolymer (A) can be produced in various ways, for example, using a known stereospecific catalyst. In practice, it can be produced by effecting a block-copolymerization in the presence of a catalyst formed from a solid titanium catalyst component, an organometallic compound catalyst component and, if necessary, an electron donor. Alternatively, it can be produced by effecting a block-copolymerization in the presence of a lithium catalyst or a Ziegler catalyst in an inert solvent. Details of such production procedures are disclosed in, for example, Japanese Patent Publication Sho 40-23798 B.

The first hydrogenated product of block-copolymer (B) to be incorporated in the composition according to the present invention is a hydrogenated product of a block-copolymer composed of blocks represented by the formula (1) or (2) given previously, wherein the content of the blocks of X amounts to 5 to 22% by weight, preferably 10 to 20% by weight, and the melt flow rate (MFR, determined at 230° C. under a load of 2160 g) for the entire block-copolymer is 0.5 to 70 g/10 min., preferably 1 to 30 g/10 min. The degree of hydrogenation is at least 90 mole %, preferably at least 95 mole %.

As the vinyl-mono-substituted aromatic hydrocarbon constituting the polymer block represented by X in the formula (1) or (2), there may be enumerated styrene and derivatives thereof, for example, styrene, α-methylstyrene, p-methylstyrene, chlorostyrene, lower alkyl-substituted styrenes and vinylnaphthalene. They may be incorporated either alone or in a combination of two or more of them.

As the conjugated diene constituting the elastomeric polymer block represented by Y in the formula (1) or (2), there may be enumerated, for example, butadiene, isoprene and chloroprene. They may be incorporated either alone or in a combination of two or more of them. n is an integer of 1 to 5, preferably 1 or 2.

Concrete examples of the block-copolymer for the first hydrogenation product (B) include those block-copolymers based on styrene which satisfy the condition for the material properties as given previously, such as styrene/ethylene-butene/styrene triblock-copolymer (SEBS), styrene/ethylene-propylene/styrene triblock-copolymer (SEPS) and styrene/ethylene-propylene diblock-copolymer (SEP). The first hydrogenation product of block-copolymer (B) may be incorporated either alone or in a combination of two or more of them.

The block-copolymer which is to be hydrogenated afterwards can be produced by, for example, effecting a block-copolymerization in an inert solvent in the presence of a lithium catalyst or a Ziegler catalyst. Details of such production procedures are disclosed in, for example, Japanese Patent Publication Sho 40-23798 B.

The hydrogenation treatment can be carried out in an inert solvent in the presence of a known hydrogenation catalyst. Details of such production procedures are disclosed in, for example, Japanese Patent Publications Sho 42-8704 B, Sho-43-6636 B and Sho-46-20814 B.

The second hydrogenation product of block-copolymer (C) is a hydrogenated product of a block-copolymer composed of blocks represented by the formula (1) or (2) given previously, wherein the content of X amounts to 30 to 80% by weight, preferably 40 to 70% by weight, and the melt flow rate (MFR, determined at 230° C., under a load of 2160 g) for the entire block-copolymer is 0.1 to 20 g/10 min., preferably 0.3 to 15 g/10 min. The hydrogenation degree is at least 90 mole %, preferably at least 95 mole %.

As the vinyl-mono-substituted aromatic hydrocarbon constituting the polymer block X and as the conjugated diene constituting the elastomeric polymer block Y in the formula (1) or (2), those which are exemplified as for the first hydrogenated product of block-copolymer (B) are exemplified. n is an integer of 1 to 5, preferably 1 or 2.

Concrete examples of the second hydrogenation product of block-copolymer (C) include those block-copolymers based on styrene which satisfy the condition for the material properties given previously, such as styrene/ethylene-butene/styrene triblock-copolymer (SEBS), styrene/ethylene-propylene/styrene triblock-copolymer (SEPS) and styrene/ethylene-propylene diblock-copolymer (SEP).

The second hydrogenation product of block-copolymer (C) may be incorporated either alone or in a combination of two or more of them.

The second hydrogenation product of block-copolymer (C) can be produced in the same manner as in the first hydrogenation product of block-copolymer (B).

The talc (D) to be incorporated in the composition according to the present invention is of a grade in which the average particle size determined by a laser beam diffraction method is in the range from 1 to 5 μm, preferably from 1 to 3 μm. Any grade of talc having an average particle size falling under the above range can be employed without any restriction.

The proportion of each component of the composition according to the present invention amounts to 41 to 71% by weight, preferably 52 to 66% by weight, for the crystalline propylene block-copolymer, 12 to 22% by weight, preferably 13 to 19% by weight, for the first hydrogenation product of block-copolymer (B), 2 to 12% by weight, preferably 2 to 6% by weight, for the second hydrogenation product of block-copolymer (C), and 15 to 25% by weight, preferably 18 to 22% by weight, for talc (D).

It is permissible, if necessary, to incorporate in the composition according to the present invention other additives, such as heat stabilizer, antistatic agent, UV-absorber, light stabilizer, aging inhibitor, antioxidant, softening agent, dispersing agent, filler, pigment and lubricant, in addition to the components (A) to (D), within the range not obstructing the purpose of the present invention.

The composition according to the present invention can be obtained by blending or melt-mixing the constituent components (A) to (D) and the additives to be incorporated on requirement on a mixing apparatus, such as Bumbury's mixer, a single-screw extruder, a twin-screw extruder or a high speed twin-screw extruder.

The composition according to the present invention obtained as above is superior in the flowability upon molding thereof and also in the balance between the material properties, such as flexural modulus, impact resistance, hardness and brittle temperature. For this reason, the composition according to the present invention can favorably be utilized as a starting material of the resin for automobile parts and, in particular, as the raw resin material for injection molding, wherein it exhibits quite better flowability upon the injection molding, whereby a molded article can be produced easily.

Concrete examples of such injection-molded automobile parts include automobile exterior parts, such as bumper, side molding, garnish, window molding and wheel house cover; and interior parts, such as instrument panel, glove box, console box, door trim, pillar trim and steering column cover.

Due to the specifically proportioned contents of the specific crystalline propylene block-copolymer, the specific hydrogenated products of block-copolymers and the specific grade of talc, the crystalline propylene block-copolymer composition for use in automobile parts according to the present invention is superior in the flowability upon molding thereof and in the balance between the physical properties, such as flexural modulus, impact resistance, hardness and brittle temperature.

MODE FOR EMBODYING THE INVENTION

Below, the present invention will be described by way of Examples.

The constituent components (A) to (D) and the relevant components employed Examples and Comparative Examples are summarized in Tables 1 to 5.

TABLE 1

Constituent Component (A)

|  | A-1 | A-2 | a-1 |
|---|---|---|---|
| For the entire (A) |  |  |  |
| MFR (g/10 min.) | 50 | 65 | 50 |
| Ethylene content (wt. %) | 5.2 | 5.1 | 5.1 |
| Av. MFR of Fp (g/10 min.) | 152 | 260 | 150 |
| MFR of Fh (g/10 min.) | 500 | 720 | — |
| Content of Fh (wt. %) | 35 | 35 | — |
| Pentad fraction of Fp (%) | 98.6 | 98.4 | 98.5 |
| Intr. viscosity of Fc (dl/g) | 8.1 | 8.8 | 8.0 |

Notes for Tables 1 and 2:
MFR: Melt flow rate according to ASTM D 1238, determined at 230° C. under a load of 2160 g.
Fp: Propylene homopolymer portion.
Fh: Low molecular weight propylene homopolymer.
Fc: Ethylene/propylene random copolymer portion.
Cont. of Fh: = (Fh/Fp) × 100
Pentad fraction of Fp: Determined as proportion of mmmm peaks to the entire absorption peaks within the methyl-carbon region in $^{13}$C-NMR spectrum.
Intr. viscosity: Intrinsic viscosity determined at 135° C. in decalin.

TABLE 2

Constituent Component (A)

|  | a-2 | a-3 | a-4 |
|---|---|---|---|
| For the entire (A) |  |  |  |
| MFR (g/10 min.) | 52 | 64 | 51 |
| Ethylene content (wt. %) | 5.3 | 5.2 | 5.2 |
| Av. MFR of Fp (g/10 min.) | 147 | 270 | 155 |
| MFR of Fh (g/10 min.) | 300 | 1200 | 500 |
| Cont. of Fh (wt. %) | 35 | 35 | 35 |

TABLE 2-continued

Constituent Component (A)

|  | a-2 | a-3 | a-4 |
|---|---|---|---|
| Pentad fraction of Fp (%) | 98.6 | 98.1 | 96.4 |
| Intr. viscosity of Fc (dl/g) | 8.2 | 8.3 | 7.9 |

Notes for Tables 1 and 2:
MFR: Melt flow rate according to ASTM D 1238, determined at 230° C. under a load of 2160 g.
Fp: Propylene homopolymer portion.
Fh: Low molecular weight propylene homopolymer.
Fc: Ethylene/propylene random copolymer portion.
Cont. of Fh: = (Fh/Fp) × 100
Pentad fraction of Fp: Determined as proportion of mmmm peaks to the entire absorption peaks within the methyl-carbon region in $^{13}$C-NMR spectrum.
Intr. viscosity: Intrinsic viscosity determined at 135° C. in decalin.

TABLE 3

Constituent Component (B)

|  | B-1 | b-1 | b-2 | b-3 | b-4 |
|---|---|---|---|---|---|
| St. cont. (wt. %) | 15 | 30 | 15 | 15 | 14 |
| MFR (g/10 min.) | 6 | 12 | 0.2 | 73 | 9 |
| Hydr. degree (mole %) | 99 | 99 | 99 | 98 | 0 |
| Type of polymer | SEBS | SEBS | SEBS | SEBS | SIS |

Noted for Table 3:
St: Styrene
SEBS: Styrene/ethylene-butene/styrene triblock-copolymer
SIS: Styrene/isoprene/styrene triblock-copolymer

TABLE 4

Constituent Component (C)

|  | C-1 | C-2 | c-1 | c-2 | c-3 | c-4 |
|---|---|---|---|---|---|---|
| St. cont. (wt. %) | 65 | 45 | 18 | 64 | 65 | 70 |
| MFR (g/10 min.) | 0.9 | 3.2 | 4.8 | 22 | 0.06 | 1.8 |
| Hydr. deg. (mole %) | 99 | 99 | 99 | 99 | 98 | 0 |
| Type of polymer | SEPS | SEBS | SEBS | SEBS | SEBS | SBS |

Noted for Table 3:
St: Styrene
SEPS: Styrene/ethylene-propylene/styrene triblock-copolymer
SEBS: Styrene/ethylene-butene/styrene triblock-copolymer
SBS: Styrene/butadiene/styrene triblock-copolymer

TABLE 5

Constituent Component (D)

|  | D-1 | d-1 | d-2 |
|---|---|---|---|
| Average P.S. (μm) | 2.4 | 7.5 | 1.2 |
| Material | talc | talc | CaCO$_3$ |

Average P.S.: Average particle size was determined by a laser beam diffraction method.

EXAMPLES 1–3 AND COMPARATIVE EXAMPLES 1–14

Using the constituent components given in Tables 1–5, the crystalline propylene block-copolymer compositions given in Tables 6–8 were obtained. For these compositions, material properties were observed. The test specimens used for the testings were prepared using an injection molding machine of The Japan Steel Works, Ltd., Model J100SA 11, by injection-molding the composition at a cylinder set temperature of 230° C. and at a metal mold temperature of 40° C. The results are shown in Tables 6–8.

TABLE 6

|  | Example | | | Compar. Example | | |
| --- | --- | --- | --- | --- | --- | --- |
|  | 1 | 2 | 3 | 1 | 2 | 3 |
| Component (A) | A-1 | A-2 | A-1 | a-1 | a-2 | a-3 |
| proportion (wt. %) | 62 | 62 | 62 | 62 | 62 | 62 |
| Component (B) | B-1 | B-1 | B-1 | B-1 | B-1 | B-1 |
| proportion (wt. %) | 14 | 14 | 10 | 14 | 14 | 14 |
| Component (C) | C-1 | C-1 | C-2 | C-1 | C-1 | C-1 |
| proportion (wt. %) | 4 | 4 | 8 | 4 | 4 | 4 |
| Component (D) | D-1 | D-1 | D-1 | D-1 | D-1 | D-1 |
| proportion (wt. %) | 20 | 20 | 20 | 20 | 20 | 20 |
| FM (MPa) | 2430 | 2410 | 2370 | 2440 | 2410 | 2350 |
| Iz (J/m) | 380 | 350 | 410 | 390 | 370 | 170 |
| HR | 74 | 73 | 73 | 74 | 73 | 72 |
| BT (° C.) | −32 | −33 | −30 | −31 | −32 | −25 |
| SFL (cm) | 142 | 155 | 145 | 130 | 133 | 163 |

TABLE 7

|  | Comparative Example | | | | | |
| --- | --- | --- | --- | --- | --- | --- |
|  | 4 | 5 | 6 | 7 | 8 | 9 |
| Component (A) | a-4 | A-1 | A-1 | A-1 | A-1 | A-1 |
| proportion (wt. %) | 62 | 62 | 62 | 62 | 62 | −62 |
| Component (B) | B-1 | b-1 | b-2 | b-3 | b-4 | B-1 |
| proportion (wt. %) | 14 | 14 | 14 | 14 | 14 | 14 |
| Component (C) | C-1 | C-1 | C-1 | C-1 | C-1 | c-1 |
| proportion (wt. %) | 4 | 4 | 4 | 4 | 4 | 4 |
| Component (D) | D-1 | D-1 | D-1 | D-1 | D-1 | D-1 |
| proportion%) (wt. %) | 20 | 20 | 20 | 20 | 20 | 20 |
| FM (MPa) | 2180 | 2590 | 2280 | 2430 | 2110 | 2280 |
| Iz (J/m) | 390 | 220 | 150 | 130 | 320 | 420 |
| HR | 65 | 76 | 69 | 74 | 62 | 68 |
| BT (° C.) | −31 | −18 | −25 | −15 | −20 | −23 |
| SFL (cm) | 143 | 143 | 136 | 150 | 142 | 145 |

TABLE 8

|  | Comparative Example | | | | | |
| --- | --- | --- | --- | --- | --- | --- |
|  | 10 | 11 | 12 | 13 | 14 | 15 |
| Component (A) | A-1 | A-1 | A-1 | A-1 | A-1 | A-1 |
| proportion (wt. %) | 62 | 62 | 62 | 62 | 62 | 62 |
| Component (B) | B-1 | B-1 | B-1 | B-1 | B-1 | B-1 |
| proportion (wt. %) | 14 | 14 | 14 | 14 | 14 | 18 |
| Component (C) | c-2 | c-3 | c-4 | C-1 | C-1 | — |
| proportion (wt. %) | 4 | 4 | 4 | 4 | 4 | — |
| Component (D) | D-1 | D-1 | D-1 | d-1 | d-2 | D-1 |
| proportion (wt. %) | 20 | 20 | 20 | 20 | 20 | 20 |
| FM (MPa) | 2390 | 2460 | 2480 | 2170 | 1980 | 2230 |
| IZ (J/m) | 100 | 160 | 210 | 250 | 380 | 390 |
| HR | 69 | 73 | 74 | 68 | 62 | 70 |
| BT (° C.) | −11 | −22 | −21 | −25 | −19 | −23 |
| SFL (cm) | 132 | 151 | 142 | 139 | 146 | 146 |

Notes for Tables 6 to 8:
FM: Flexural modulus, determined according to ASTM D 790.
IZ: Izod impact strength, determined according to ASTM D 256 at −30° C.
HR: Surface hardness, determined according to ASTM D 685 using steel ball R, the values being represented in the R-scale.
BT: Brittle temperature, determined according to ASTM D 746.
SFL: Flowability, expressed by spiral flow length determined by carrying out an injection molding of the composition using an injection mold having a spiral flow path of a thickness of 3 mm, a width of 10 mm and a length of 2,000 mm and observing the flow length of the resin.

From the results of Tables 6 to 8, it is seen that all the compositions of Examples 1 to 3 are superior in the flowability (SFL) and also in the balance between the flexural modulus (FM), Izod impact strength (IZ), surface hardness (HR) and brittle temperature (BT) as well.

On the contrary, the compositions of Comparative Examples 1 and 2 exhibit inferior flowabilities and the composition of Comparative Example 3 is inferior in the Izod impact strength and brittle temperature.

The composition of Comparative Example 4 is inferior in the flexural modulus and surface hardness. The composition of Comparative Examples 5 is inferior in the Izod impact strength and brittle temperature. The composition of Comparative Example 6 is inferior in the Izod impact strength, surface hardness and flowability. The composition of Comparative Example 7 is inferior in the Izod impact strength and brittle temperature, the composition of Comparative Example 8 is inferior in the flexural modulus, surface hardness and brittle temperature and the composition of Comparative Example 9 is inferior in the surface hardness and brittle temperature.

The composition Ca Comparative Example 10 exhibits inferior values for the Izod impact strength, for the surface hardness, for the brittle temperature and for the flowability. The compositions of Comparative Examples 11 and 12 are inferior in the Izod impact strength and in the brittle temperature.

The composition of Comparative Example 13 is inferior in all the material properties. Comparative Examples 14 gave inferior results as to the flexural modulus, surface hardness and brittle temperature and Comparative Example 15 gave inferior results as to the flexural modulus and brittle temperature.

What is claimed is:

1. A crystalline propylene block-copolymer composition for use in automobile parts, comprising
    (A) 41 to 71% by weight of a crystalline propylene block-copolymer composed of a propylene homopolymer portion (Fp) and an ethylene/propylene random copolymer portion (Fc) and having an ethylene content of 1 to 10% by weight and a melt flow rate (MFR, determined at 230° C. under a load of 2160 g) of 20 to 100 g/10 min.,
    (B) 12 to 22% by weight of a first hydrogenated product of a block-copolymer composed of blocks represented by the following formula (1) or (2), namely, $$X\text{-}Y \quad (1)$$

$$X(\text{-}Y\text{-}X)_n \quad (2)$$

in which X stands for a polymer block of a vinyl-mono-substituted aromatic hydrocarbon, Y stands for an elastomeric polymer block of a conjugated diene and n is an integer of 1 to 5, wherein the content of X amounts to 5 to 22% by weight and the melt flow rate (MFR) for the entire block-copolymer is 0.5 to 70 g/10 min. and wherein the hydrogenation degree is at least 90 mole %, (C) 2 to 12% by weight of a second hydrogenated product of a block-copolymer composed of blocks represented by the following formula (1) or (2), namely,

X-Y    (1)

X(-Y-X)$_n$    (2)

in which X stands for a polymer block of a vinyl-mono-substituted aromatic hydrocarbon, Y stands for an elastomeric polymer block of a conjugated diene and n is an integer of 1 to 5, wherein the content of X amounts to 30 to 80% by weight and the melt flow rate (MFR) for the entire block-copolymer is 0.1 to 20 g/10 min. and wherein the hydrogenation degree is at least 90 mole %, and (D) 15 to 25% by weight of talc of a grade having an average particle size, determined by a laser beam diffraction method, of 1 to 5 µm, wherein, in the crystalline propylene block-copolymer (A), the said propylene homopolymer portion (Fp) contains 20 to 50% by weight of a low molecular weight propylene homopolymer (Fh) having a melt flow rate (MFR, determined at 230° C. under a load of 2160 g) of 400 to 1,000 g/10 min. and is constituted of a propylene homopolymer having an average melt flow rate (MFR, determined at 230° C. under a load of 2160 g), for the entire propylene homopolymer portion (Fp), of 100 to 350 g/10 min. and an isotactic pentad fraction (mmmm), determined by $^{13}$C-NMR, of at least 98% and the said ethylene/propylene random copolymer portion (Fc) is constituted of an ethylene/propylene random copolymer having an intrinsic viscosity [η], determined at 135° C. in decalin, of 7 dl/g or higher.

2. A crystalline propylene block-copolymer composition as claimed in claim 1, wherein the vinyl-mono-substituted aromatic hydrocarbon constituting the polymer block represented by X of the formula (1) or (2) in the first and second hydrogenation products of block-copolymers (B) and (C) is constituted of one or more members selected from the group consisting of styrene, α-methylstyrene, p-methylstyrene, chlorostyrene, lower alkyl-substituted styrenes and vinylnaphthalene.

3. A crystalline propylene block-copolymer composition as claimed in claim 1, wherein the conjugated diene constituting the elastomeric polymer block represented by Y of the formula (1) or (2) in the first and second hydrogenation products of block-copolymers (B) and (C) is constituted of one or more members selected from the group consisting of butadiene, isoprene and chloroprene.

4. A crystalline propylene block-copolymer composition as claimed in claim 1, wherein the first and second hydrogenation products of block-copolymers (B) and (C) are each constituted of one or more members selected from the group consisting of a styrene/ethylene-butene/styrene triblock-copolymer (SEBS), a styrene/ethylene-propylene/styrene triblock-copolymer (SEPS) and a styrene/ethylene-propylene diblock-copolymer (SEP).

5. A crystalline propylene block-copolymer composition for use in automobile parts as claimed in claim 1, as an injection molding material.

* * * * *